(12) United States Patent
Yoshida et al.

(10) Patent No.: US 11,398,045 B2
(45) Date of Patent: Jul. 26, 2022

(54) THREE-DIMENSIONAL IMAGING DEVICE AND THREE-DIMENSIONAL IMAGING CONDITION ADJUSTING METHOD

(71) Applicant: FANUC CORPORATION, Yamanashi (JP)

(72) Inventors: Junichirou Yoshida, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/778,070

(22) Filed: Jan. 31, 2020

(65) Prior Publication Data

US 2020/0273194 A1    Aug. 27, 2020

(30) Foreign Application Priority Data

Feb. 27, 2019   (JP) .............................. JP2019-033607

(51) Int. Cl.
*G06T 7/593* (2017.01)
*H04N 5/235* (2006.01)
(Continued)

(52) U.S. Cl.
CPC .............. *G06T 7/593* (2017.01); *G06T 7/521* (2017.01); *H04N 5/2353* (2013.01);
(Continued)

(58) Field of Classification Search
None
See application file for complete search history.

(56) References Cited

U.S. PATENT DOCUMENTS 5,530,514 A * 6/1996 Lisson .................. G02B 7/346
                                                        396/128
6,791,722 B1 * 9/2004 Komiya ................ H04N 1/053
                                                        358/453

(Continued)

FOREIGN PATENT DOCUMENTS

EP   2402907 A1   1/2012
EP   2600103 A1   6/2013
(Continued)

OTHER PUBLICATIONS

Japanese Search Report by Registered Search Organization dated May 19, 2021, for Japanese Patent Application No. 2019033607.

*Primary Examiner* — Tyler W. Sullivan
(74) *Attorney, Agent, or Firm* — Karceski IP Law, PLLC (57) ABSTRACT

A three-dimensional imaging device includes a distance image acquiring unit configured to acquire distance images by switching exposure conditions; an effective pixel count calculation unit that calculates an effective pixel count; an ineffective pixel identifying unit that identifies ineffective pixels; and an exposure condition adjusting unit that sets the exposure conditions. The exposure condition adjusting unit sets a reference exposure condition, determines whether a reference effective pixel count is equal to or less than a first threshold value, and, in response to the reference effective pixel count being equal to or less than the first threshold value, sets an additional exposure condition that maximizes a total effective pixel count of a total distance image, and repeats additional setting of the additional exposure condition using the total distance image as a new reference distance image until the total effective pixel count becomes larger than the first threshold value.

6 Claims, 8 Drawing Sheets

(51) Int. Cl.

| | |
|---|---|
| *H04N 13/239* | (2018.01) |
| *G06T 7/521* | (2017.01) |
| *H04N 13/254* | (2018.01) |

(52) U.S. Cl.

CPC ......... *H04N 13/239* (2018.05); *H04N 13/254* (2018.05); *G06T 2207/10028* (2013.01); *G06T 2207/10144* (2013.01); *G06T 2207/20212* (2013.01)

(56) References Cited

U.S. PATENT DOCUMENTS

| | | | | |
|---|---|---|---|---|
| 9,781,352 | B2* | 10/2017 | Nagashima | H04N 13/296 |
| 10,190,873 | B1* | 1/2019 | Yamagami | G01B 11/2545 |
| 2009/0059033 | A1* | 3/2009 | Shimada | H04N 13/296 |
| | | | | 348/229.1 |
| 2010/0007896 | A1* | 1/2010 | Fishbaine | G01N 21/8806 |
| | | | | 356/603 |
| 2010/0141752 | A1* | 6/2010 | Yamada | G01N 1/312 |
| | | | | 345/589 |
| 2012/0002841 | A1 | 1/2012 | Aratani et al. | |
| 2012/0176514 | A1* | 7/2012 | Tsurube | H04N 13/271 |
| | | | | 348/222.1 |
| 2012/0303317 | A1 | 11/2012 | Takimasa et al. | |
| 2013/0075376 | A1* | 3/2013 | Shigeta | B41C 1/05 |
| | | | | 219/121.68 |
| 2013/0258139 | A1* | 10/2013 | Omori | H04N 5/265 |
| | | | | 348/239 |
| 2016/0212316 | A1 | 7/2016 | Nagashima | |
| 2017/0206417 | A1* | 7/2017 | Aoyama | G06V 20/20 |
| 2017/0278260 | A1 | 9/2017 | Matsui | |
| 2019/0033067 | A1 | 1/2019 | Yamagami et al. | |
| 2020/0162718 | A1* | 5/2020 | Tamaki | H01L 27/14625 |
| 2020/0334895 | A1* | 10/2020 | Skotheim | G06T 5/50 |
| 2020/0342563 | A1* | 10/2020 | Yoshida | G06T 7/12 |
| 2021/0248758 | A1* | 8/2021 | Li | G06T 3/4015 |

FOREIGN PATENT DOCUMENTS

| | | |
|---|---|---|
| EP | 3046321 A1 | 7/2016 |
| EP | 3561450 A1 | 10/2019 |
| JP | 2012013514 A | 1/2012 |
| JP | 2012032305 A | 2/2012 |
| JP | 2016134723 A | 7/2016 |
| JP | 2017181488 A | 10/2017 |
| JP | 2018105682 A | 7/2018 |
| JP | 2019027947 A | 2/2019 |
| WO | 2008124397 A1 | 10/2008 |

* cited by examiner

THREE-DIMENSIONAL IMAGING DEVICE AND THREE-DIMENSIONAL IMAGING CONDITION ADJUSTING METHOD

CROSS-REFERENCE TO RELATED APPLICATIONS

This application is based on and claims priority to Japanese Patent Application No. 2019-033607, filed on Feb. 27, 2019, the entire content of which is incorporated herein by reference.

FIELD OF THE INVENTION

The present invention relates to a three-dimensional imaging device and a three-dimensional imaging condition adjusting method.

BACKGROUND OF THE INVENTION

There is a known distance image generating device in which distance values obtained by combining a plurality of distance values of corresponding pixels between a plurality of distance images are used as distance values of pixels of a combined distance image (see, for example, Japanese Unexamined Patent Application, Publication No. 2017-181488).

A control unit of the distance image generating device performs image acquisition processing by controlling a light emitting unit and a light receiving sensor in accordance with an imaging condition that is changed for each imaging frame. The imaging condition includes the light emission amount of the light emitting unit, the exposure time of the light receiving sensor, and the like.

SUMMARY OF THE INVENTION

An aspect of the present disclosure is directed to a three-dimensional imaging device includes a distance image acquiring unit configured to acquire distance images by switching exposure conditions, an effective pixel count calculation unit that calculates an effective pixel count, which is a number of effective pixels having a distance value in each of the acquired distance images, an ineffective pixel identifying unit that identifies ineffective pixels, which are pixels other than the effective pixels of the distance images, and an exposure condition adjusting unit that sets the exposure conditions used for acquiring the distance images of a measurement object, in which the exposure condition adjusting unit sets a reference exposure condition, which is one of the exposure conditions that is used as a reference, determines whether or not a reference effective pixel count, which is the effective pixel count of a reference distance image acquired under the reference exposure condition, is equal to or less than a first threshold value, and in response to the reference effective pixel count being equal to or less than the first threshold value, sets an additional exposure condition that is different from the previously set exposure conditions and that maximizes a total effective pixel count, which is the effective pixel count of a total distance image that is a logical sum of an additional distance image acquired under the additional exposure condition and the reference distance image, and repeats additional setting of the additional exposure condition using the total distance image as a new reference distance image until the total effective pixel count becomes larger than the first threshold value.

DESCRIPTION OF EMBODIMENT(S) OF THE INVENTION

A three-dimensional imaging device 1 and a three-dimensional imaging condition adjusting method according to a first embodiment of the present disclosure will be described below with reference to the drawings.

Figure 1:
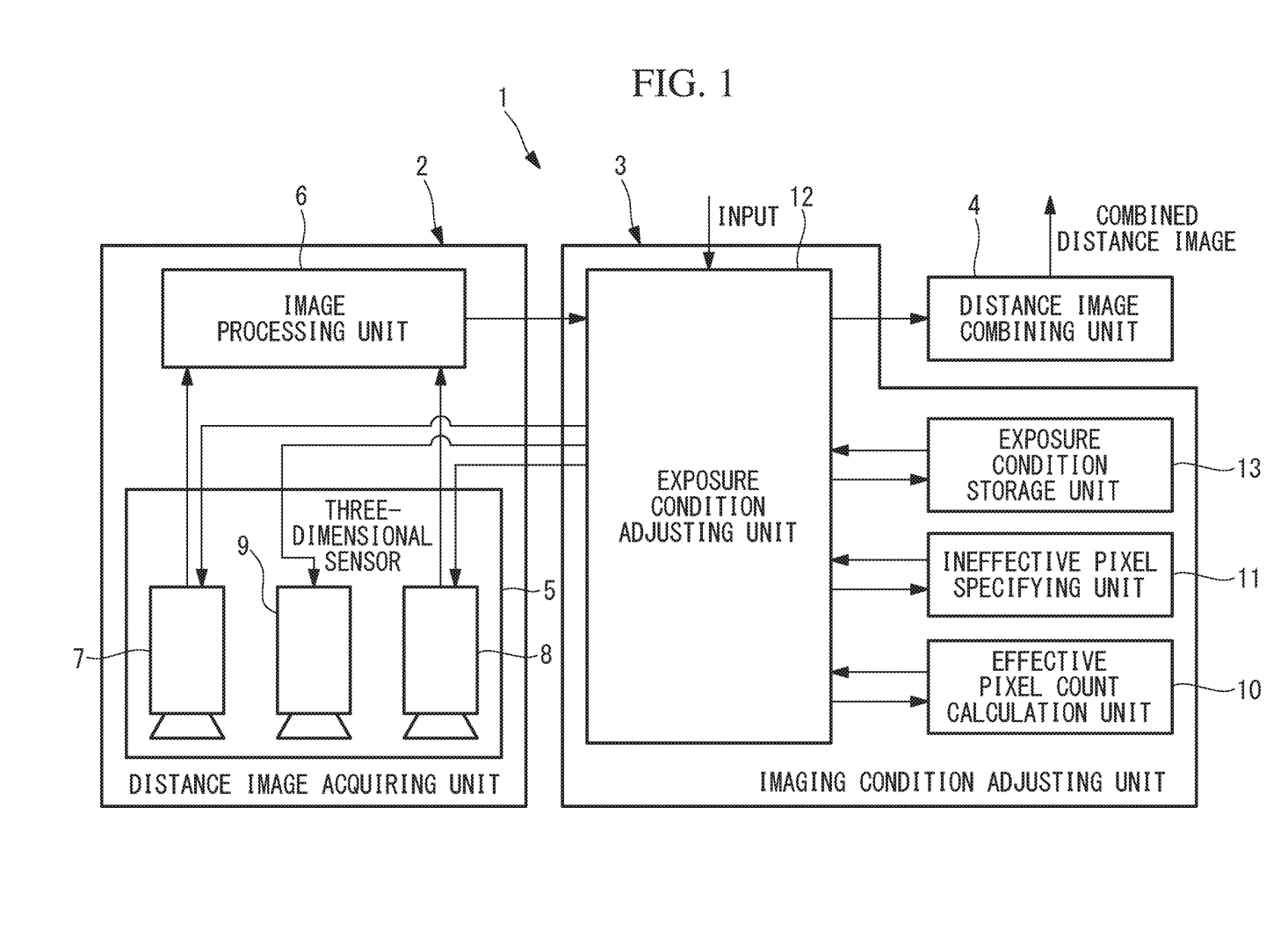
FIG. 1 is a block diagram illustrating a three-dimensional imaging device according to a first embodiment of the present disclosure.

As illustrated in FIG. 1, the three-dimensional imaging device 1 according to the present embodiment includes a distance image acquiring unit 2 that acquires distance images, an imaging condition adjusting unit 3 that is connected to the distance image acquiring unit 2 and that adjusts an imaging condition based on the acquired distance images, and a distance image combining unit 4 that combines the acquired distance images.

The distance image acquiring unit 2 includes a three-dimensional sensor 5 and an image processing unit 6.

The three-dimensional sensor 5 includes two two-dimensional cameras 7 and 8 that are disposed with a space therebetween in a direction intersecting the optical axes of the two-dimensional cameras 7 and 8 and that have overlapping visual field ranges, and a projector 9 for radiating illumination light to the visual field ranges of both the two-dimensional cameras 7 and 8.

The projector 9 projects a pattern on a surface of a measurement object O.

The image processing unit 6 includes a processor and a memory, processes two two-dimensional images G1 and G2 output from the three-dimensional sensor 5, and generates a distance image by calculating a distance value for each pixel.

Figure 2:
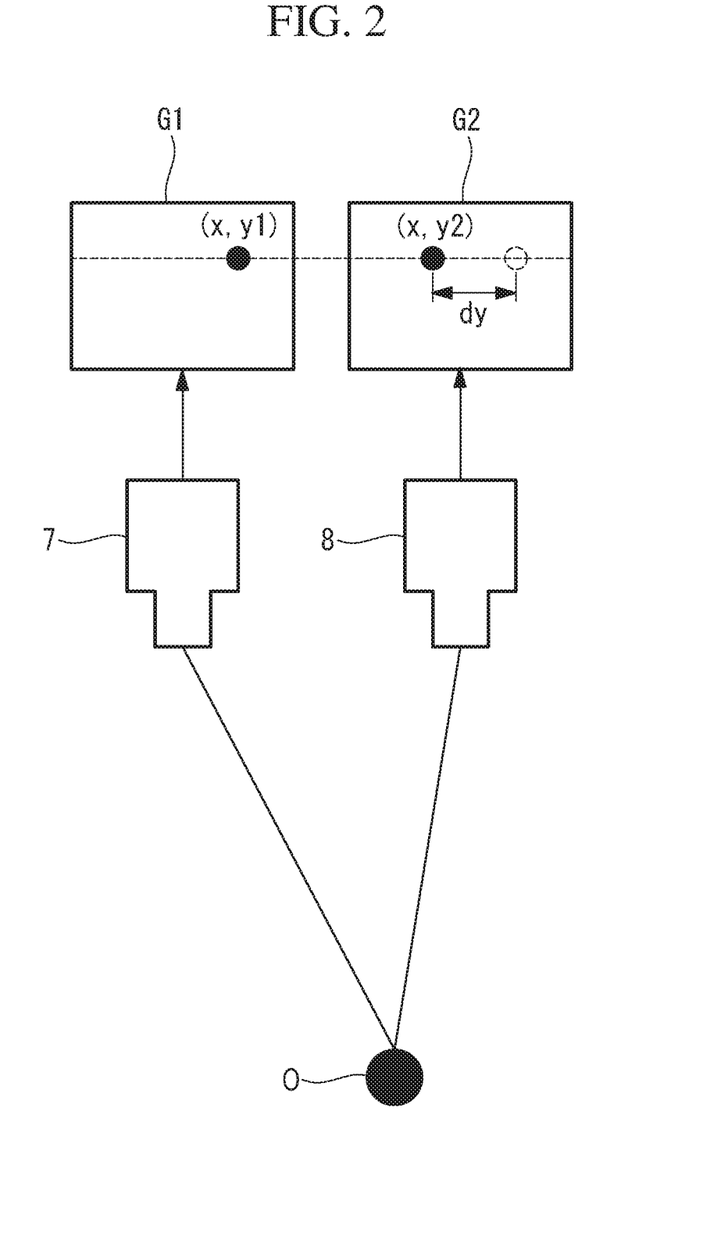
FIG. 2 is a diagram for explaining parallax in the three-dimensional imaging device in FIG. 1.

As illustrated in FIG. 2, the two two-dimensional cameras 7 and 8 of the three-dimensional sensor 5 are arranged at relative positions where x positions are completely matched, where x corresponds to the vertical direction of the images G1 and G2, and y corresponds to the horizontal direction. When an image of the same measurement object O is captured by the two two-dimensional cameras 7 and 8, the measurement object O is arranged in the images G1 and G2 at positions where only the y position differs by a parallax dy.

Accordingly, the distance from the three-dimensional sensor 5 to the measurement object O can be calculated using the parallax dy according to the following formula.

distance=y-direction interval between the optical axes of the two-dimensional cameras 7 and 8×focal length/parallax dy In the image processing unit 6, when the two two-dimensional images G1 and G2 acquired by capturing images of the same measurement object O by the two two-dimensional cameras 7 and 8 are input, a corresponding area is searched for between the two-dimensional images G1 and G2.

By using an image of a small area in one of the two-dimensional images G1 and G2 as a template, a corresponding area is searched for by using template matching in which a corresponding area having the same pattern as the template is searched for in a search area of the other one of the two-dimensional images G1 and G2.

Figure 3:
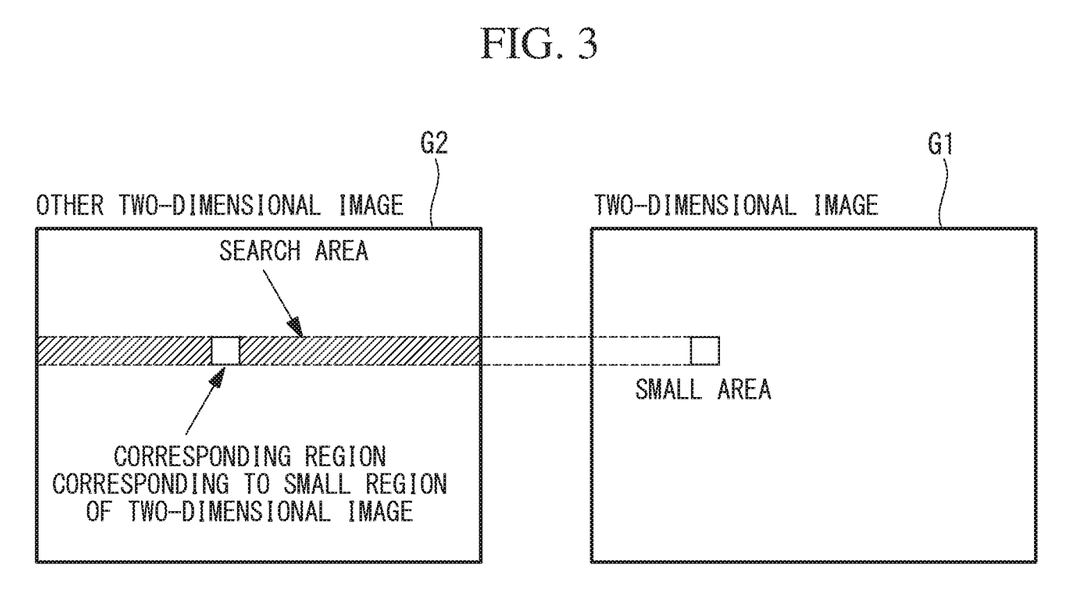
FIG. 3 is a diagram illustrating generation of a distance image in the three-dimensional imaging device in FIG. 1.

As described above, since the two two-dimensional images G1 and G2 are acquired by the two two-dimensional cameras 7 and 8 in which the x positions are completely matched, as illustrated in FIG. 3, the search area is an area extending in the y direction, which includes the small area serving as a template.

In the present embodiment, the degree of matching is evaluated using a sum of absolute differences (SAD). SAD is the sum of absolute values of errors between the small area and a corresponding area. Therefore, the area having the smallest SAD in the search area can be extracted as the corresponding area.

Here, a threshold value of SAD is set in advance, and only a corresponding area in which the SAD is minimum in the search area and the SAD is less than the threshold value is output as the corresponding area having a distance value. By covering all the pixels while moving the small area set in one two-dimensional image G1 vertically and horizontally one pixel at a time, the distance values for the entire image are calculated, and a distance image is generated.

The imaging condition adjusting unit 3 includes a processor and a memory. The imaging condition adjusting unit 3 includes an effective pixel count calculation unit 10 that calculates an effective pixel count, which is the number of effective pixels having a distance value in the distance image generated by the image processing unit 6, and an ineffective pixel identifying unit 11 for identifying ineffective pixels having no distance value. In addition, the imaging condition adjusting unit 3 includes an exposure condition adjusting unit 12 that sets an exposure condition used for imaging the measurement object O, and an exposure condition storage unit 13 that stores the set exposure condition.

Figure 4:
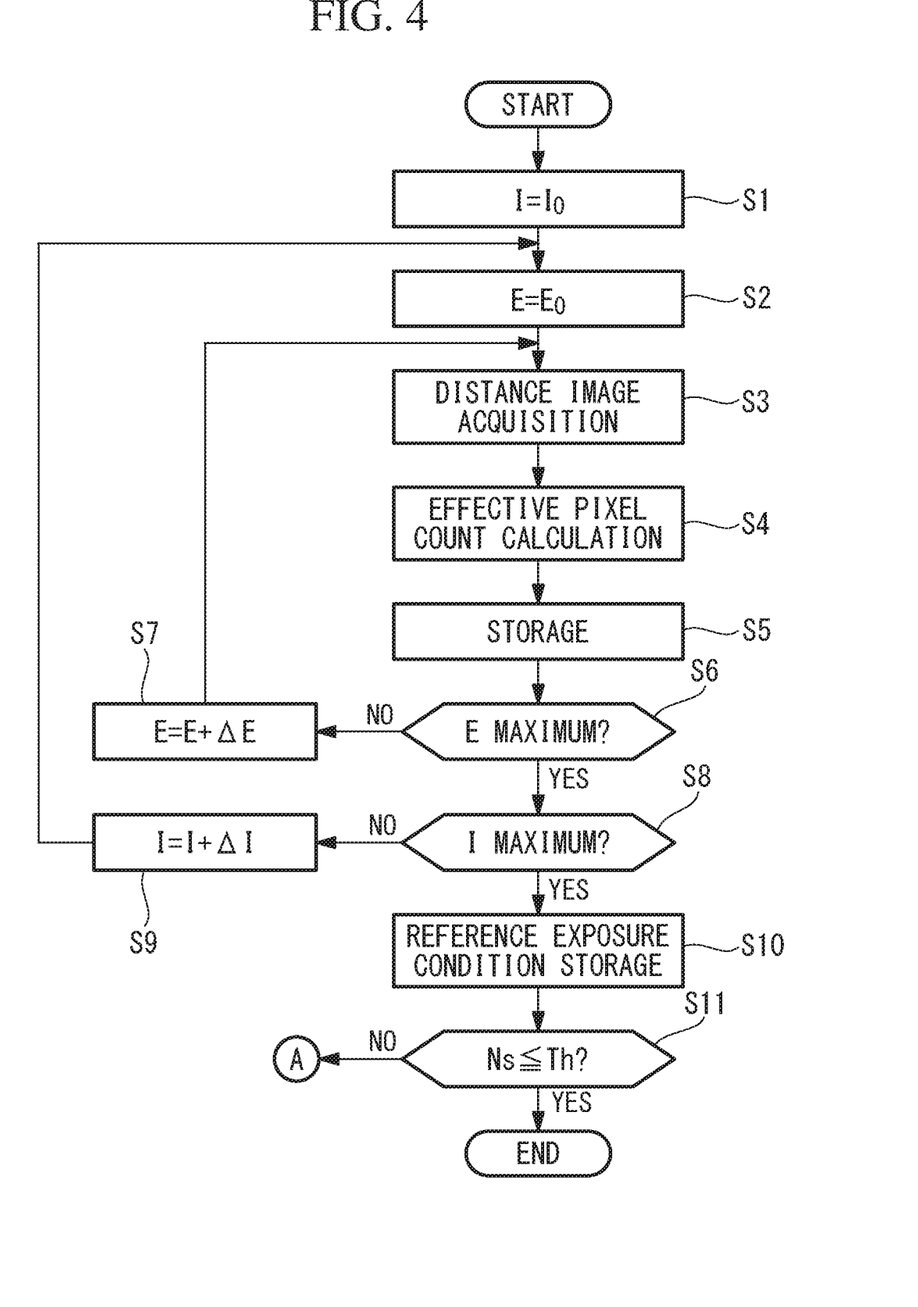
FIG. 4 is a flowchart for explaining a three-dimensional imaging condition adjusting method used by the three-dimensional imaging device in FIG. 1.
Figure 5:
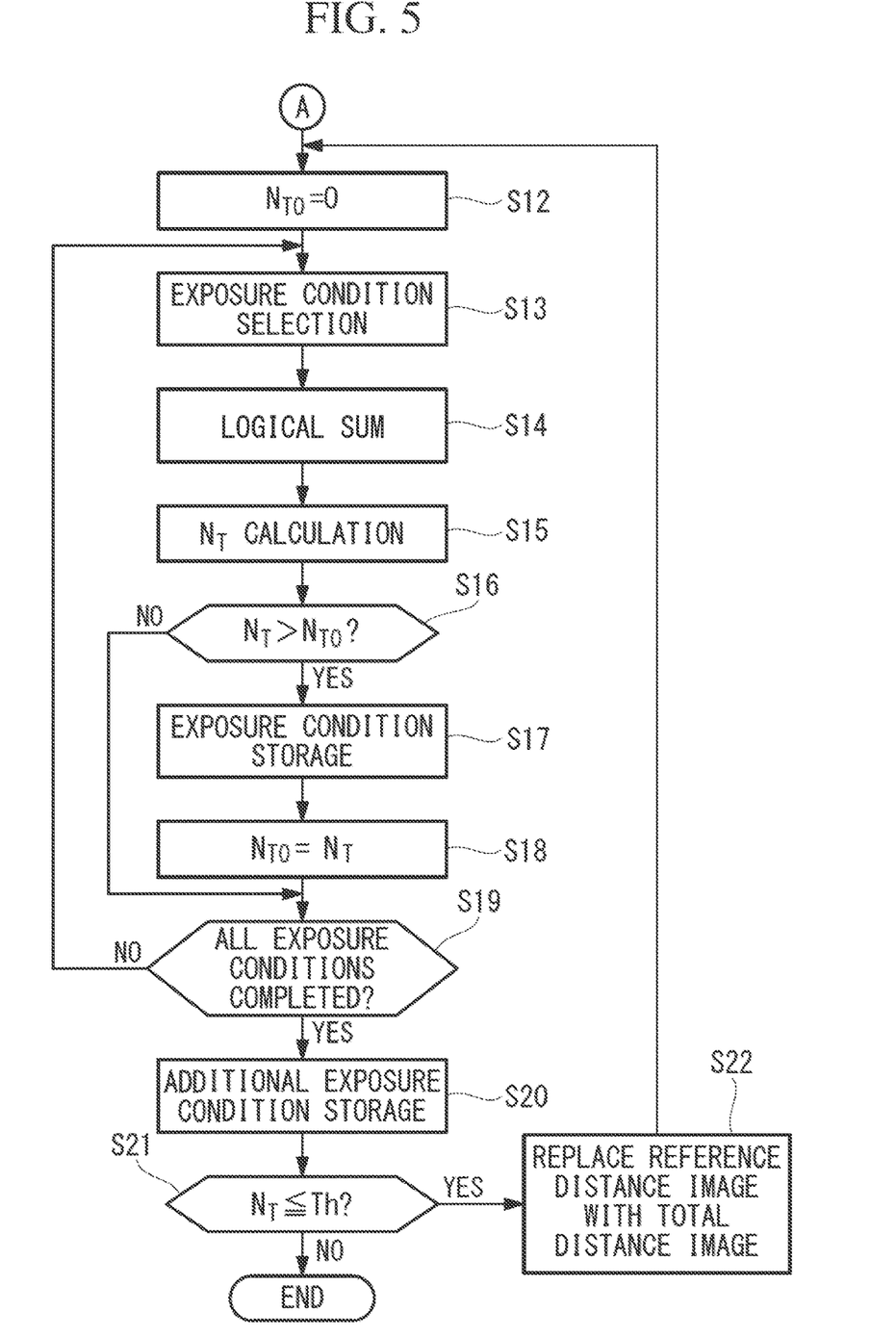
FIG. 5 is a flowchart following the flowchart in FIG. 4 for explaining the three-dimensional imaging condition adjusting method used by the three-dimensional imaging device in FIG. 1.

The exposure condition adjusting unit 12 receives a command from the outside to set a new exposure condition, and, according to the exposure condition adjusting method illustrated in the flowcharts in FIGS. 4 and 5, sets the exposure condition used for acquisition of distance images of the measurement object O.

First, a reference exposure condition, which is an exposure condition that is used as a reference, is set.

The setting of the reference exposure condition is performed by switching the exposure condition and acquiring a distance image by the three-dimensional sensor 5 under each exposure condition. As the exposure condition, the light intensity I of the illumination light from the projector 9 is switched among several levels, and the exposure time E of the two-dimensional cameras 7 and 8 is switched among several levels, and a plurality of exposure conditions including all combinations of the light intensities I and the exposure times E are realized.

Specifically, as illustrated in FIG. 4, the exposure condition adjusting unit 12 sets the light intensity I of the projector 9 of the three-dimensional sensor 5 to a minimum value $I_0$ (step S1), and sets the exposure time E of the two-dimensional cameras 7 and 8 to a minimum value $E_0$ (step S2).

Under the set exposure condition, the distance image acquiring unit 2 acquires a distance image (step S3).

The distance image acquired by the distance image acquiring unit 2 is sent to the exposure condition adjusting unit 12. The exposure condition adjusting unit 12 sends the distance image to the effective pixel count calculation unit 10. The effective pixel count calculation unit 10 determines for each pixel whether or not the sent distance image has an effective distance value, and calculates the effective pixel count, which is the number of effective pixels having an effective distance value (Step S4).

The distance image and the calculated effective pixel count are stored in the exposure condition adjusting unit 12 in association with the exposure condition (step S5). Then, the exposure condition adjusting unit 12 determines whether or not the exposure time E of the two-dimensional cameras 7 and 8 is the maximum value (step S6), and when the exposure time E is not the maximum value (condition="NO"), the exposure time E is increased by one step (for example, $\Delta E=+1\%$) (step S7), and the process from step S3 is repeated until the exposure time E reaches the maximum value.

In step S6, when the exposure time E reaches the maximum value (condition="YES"), it is determined whether or not the light intensity I of the projector 9 is the maximum value (step S8), and in the case where the light intensity I is not the maximum value (condition="NO"), the light intensity I is increased by one step (for example, $\Delta I=+1\%$)(step S9), and the processes from step S2 are repeated until the light intensity I reaches the maximum value (condition="YES").

Consequently, the distance images and the effective pixel counts for a plurality of exposure conditions consisting of all combinations of the light intensities I of the illumination light and the exposure times E are acquired and stored in association with the exposure times E, respectively.

When the distance images and the effective pixel counts corresponding to all the exposure conditions are acquired, the exposure condition adjusting unit 12 extracts the exposure condition having the largest corresponding effective pixel count from the stored exposure conditions, and stores it in the exposure condition storage unit 13 as a reference exposure condition (step S10). Thereby, the reference exposure condition is set.

Next, it is determined whether or not the effective pixel count (reference effective pixel count) Ns in the reference distance image, which is the distance image acquired under the reference exposure condition, is equal to or less than a predetermined threshold value (first threshold value) Th (step S11).

If the reference effective pixel count Ns is larger than the threshold value Th in step S11, the exposure condition adjusting process ends. In this case, the exposure condition used when acquiring the distance image of the measurement object O is the only reference exposure condition.

If the reference effective pixel count Ns is equal to or smaller than the threshold value Th in step S11, an additional exposure condition is set.

Specifically, as illustrated in FIG. 5, the additional exposure condition is set by setting the initial value $N_{T0}$ of the total effective pixel count to zero (step S12) and selecting one of the exposure conditions that is different from the already set exposure condition (step S13). Then, a total distance image, which is a logical sum of the distance image acquired under the selected exposure condition and the reference distance image, is generated (step S14). Thereafter, the generated total distance image is input to the effective pixel count calculation unit 10, and the effective pixel count (total effective pixel count $N_T$) of the total distance image is calculated (step S15).

It is determined whether or not the total effective pixel count $N_T$ is larger than the initial value $N_{T0}$ (step S16), and, in the case where the total effective pixel count $N_T$ is larger than the initial value $N_{T0}$ (condition="YES"), the selected exposure condition is temporarily stored (step S17), and the total effective pixel count $N_T$ is replaced with a new initial value $N_{T0}$ (step S18). Then, it is determined whether or not all the exposure conditions have been completed (step S19), and, in the case where all the exposure conditions have not been completed (condition="NO"), the processes from step S13 are repeated.

In step S16, when the total effective pixel count $N_T$ is equal to or less than the initial value $N_{T0}$ (condition="NO"), the processes from step S19 are executed. If it is determined in step S19 that all exposure conditions have been completed (condition="YES"), the finally stored exposure condition is stored (additionally set) in the exposure condition storage unit 13 as an additional exposure condition (step S20).

At this time, the total effective pixel count $N_T$ of the total distance image, which is the logical sum of the additional distance image acquired under the additional exposure condition and the reference distance image, is the largest.

Furthermore, it is determined whether or not the total effective pixel count $N_T$ is equal to or smaller than the threshold value Th (step S21), and, in the case where the total effective pixel count $N_T$ is equal to or smaller than the threshold value Th (condition="YES"), the total distance image is replaced with a new reference distance image (step S22), and the processes from step S12 are repeated.

In step S21, in the case where the total effective pixel count $N_T$ is larger than the threshold value Th (condition="NO"), the exposure condition adjusting process is completed, and two or more exposure conditions including the reference exposure condition stored in the exposure condition storage unit 13 are the exposure conditions used when acquiring the distance images of the measurement object O.

After the exposure conditions have been set, when a command for acquiring distance images of the actual measurement object O is input, the three-dimensional imaging device 1 acquires distance images under the set one or more exposure conditions, and the acquired distance images are combined by the distance image combining unit 4. Consequently, it is possible to output a combined distance image having a larger effective pixel count, which includes pixels for which distance values could not be acquired under only the reference exposure condition.

Thus, according to the three-dimensional imaging device 1 and the imaging condition adjusting method according to the present embodiment, the exposure condition to be used can be set before obtaining the distance image of the measurement object O, and the subsequent distance image of the measurement object O can be acquired in a short time. That is, there is an advantage that the time required for measurement can be greatly reduced compared with the conventional method in which distance images of the measurement object O are acquired while switching the exposure time E exhaustively.

Further, in the present embodiment, the exposure condition that maximizes the effective pixel count Ns is selected as the reference exposure condition; however, the present invention is not limited to this. For example, any exposure condition in which the effective pixel count Ns exceeds a second threshold value may be set as the reference exposure condition while switching the exposure condition. By appropriately setting a second threshold value, the reference exposure condition can be set in a short time without detecting the effective pixel count for all the exposure conditions.

In addition, when determining whether or not the pixel is an effective pixel, if the pixel is an effective pixel, the SAD value of the pixel may be stored in association therewith. In the case where effective pixels of the distance images to be combined overlap when generating the combined distance image in the distance image combining unit 4, the distance values having the smaller SAD value, that is, the distance values having the higher degree of matching, may be adopted as the pixel values of the combined distance image. Consequently, a combined distance image having more reliable distance values can be acquired.

Next, the three-dimensional imaging device 21 according to the second embodiment will be described below with reference to the drawings.

In the description of the present embodiment, the same reference numerals are given to portions having the same configuration as the three-dimensional imaging device 1 according to the first embodiment described above, and the description thereof is omitted.

Figure 6:
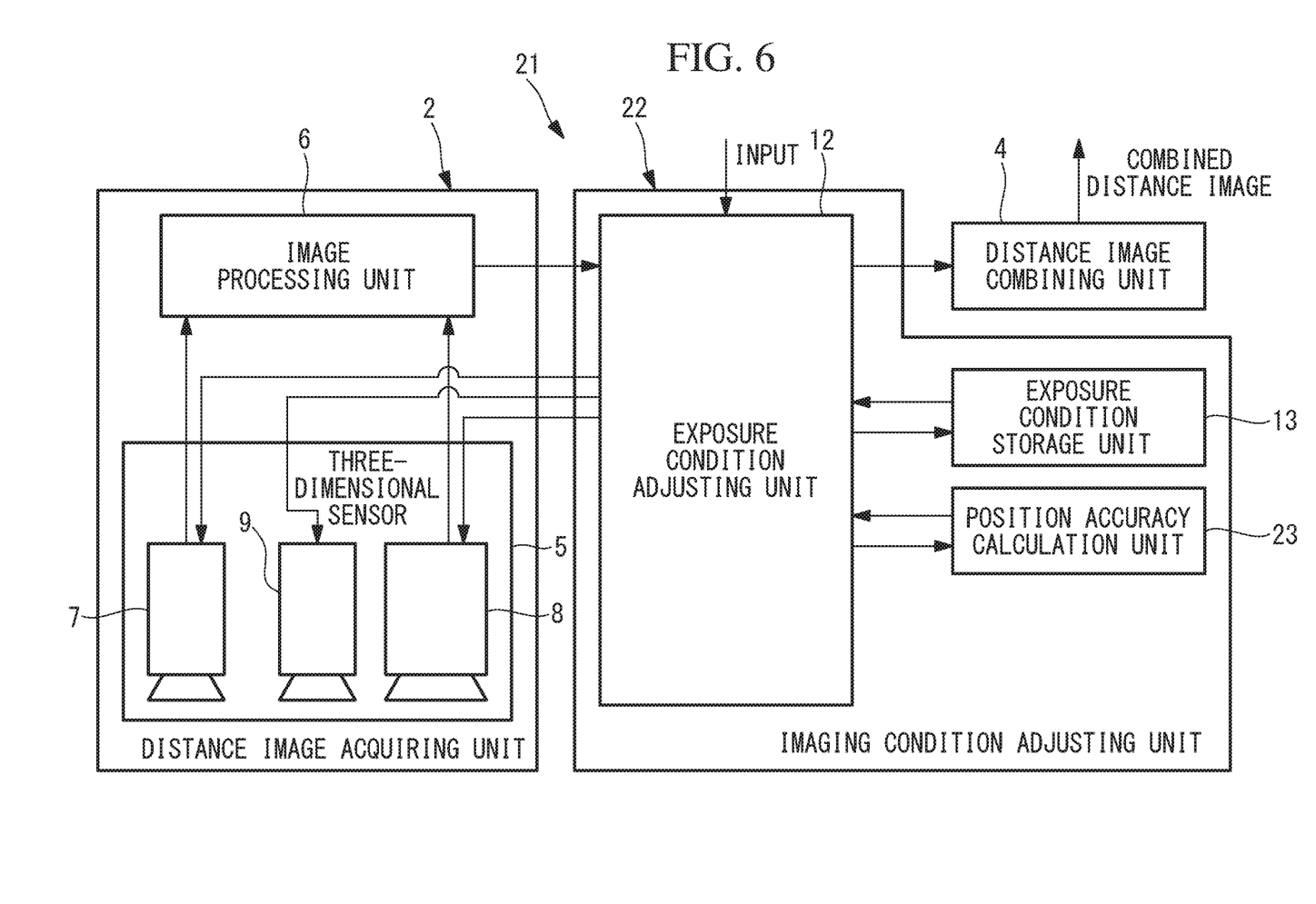
FIG. 6 is a block diagram showing a three-dimensional imaging device according to a second embodiment.

As illustrated in FIG. 6, the three-dimensional imaging device 21 according to the present embodiment includes the distance image acquiring unit 2, an imaging condition adjusting unit 22, and the distance image combining unit 4.

The distance image acquiring unit 2 and the distance image combining unit 4 are the same as those in the first embodiment.

The imaging condition adjusting unit 22 includes a processor and a memory.

The imaging condition adjusting unit 22 includes the exposure condition adjusting unit 12, the exposure condition storage unit 13, and a position accuracy calculation unit 23 that calculates, for each exposure condition, a variation in the position of the measurement object O when the position of the measurement object O is recognized by image processing from a distance image among a plurality of distance images acquired under each exposure condition.

Figure 7:
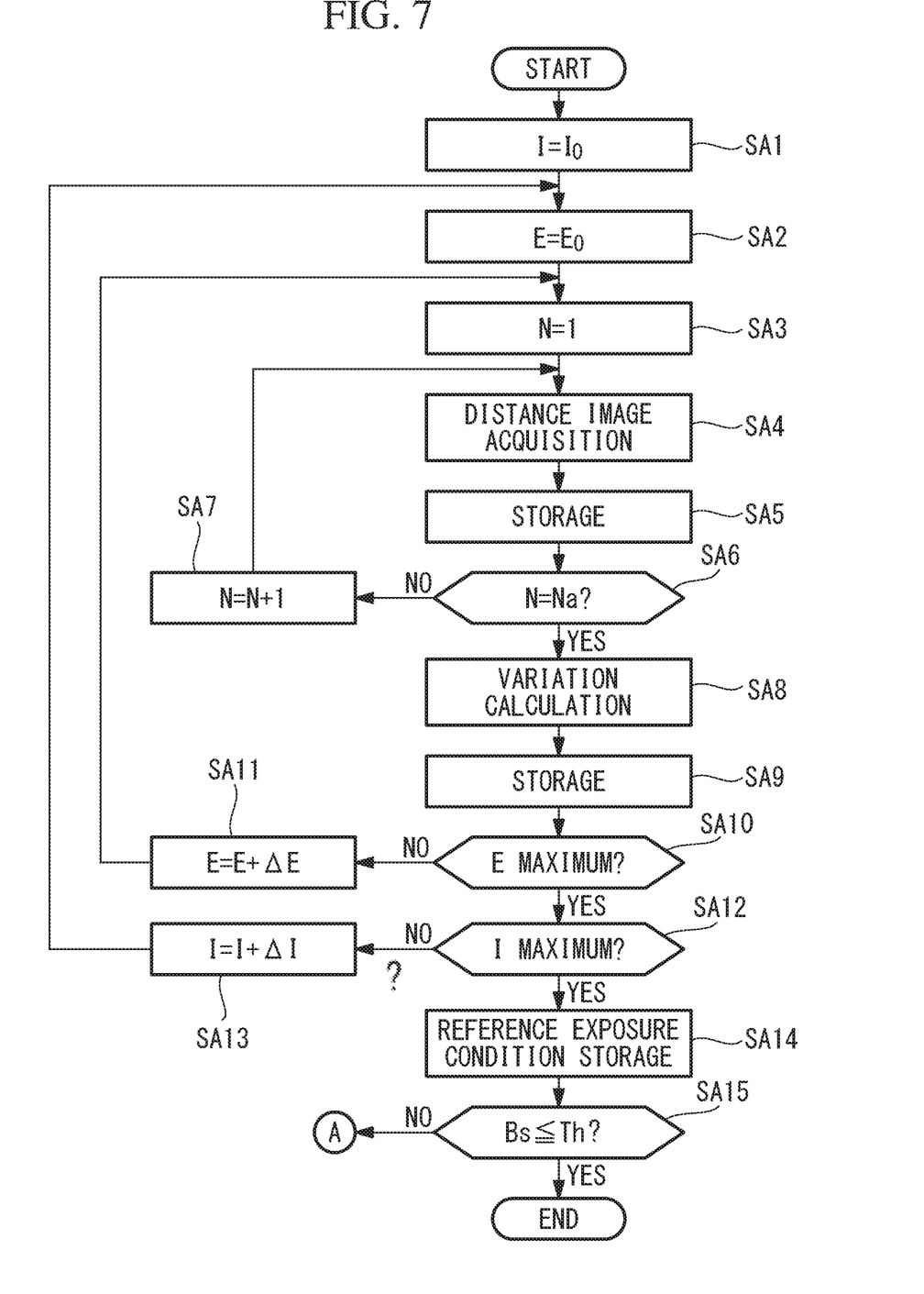
FIG. 7 is a flowchart for explaining a three-dimensional imaging condition adjusting method used by the three-dimensional imaging device in FIG. 6.
Figure 8:
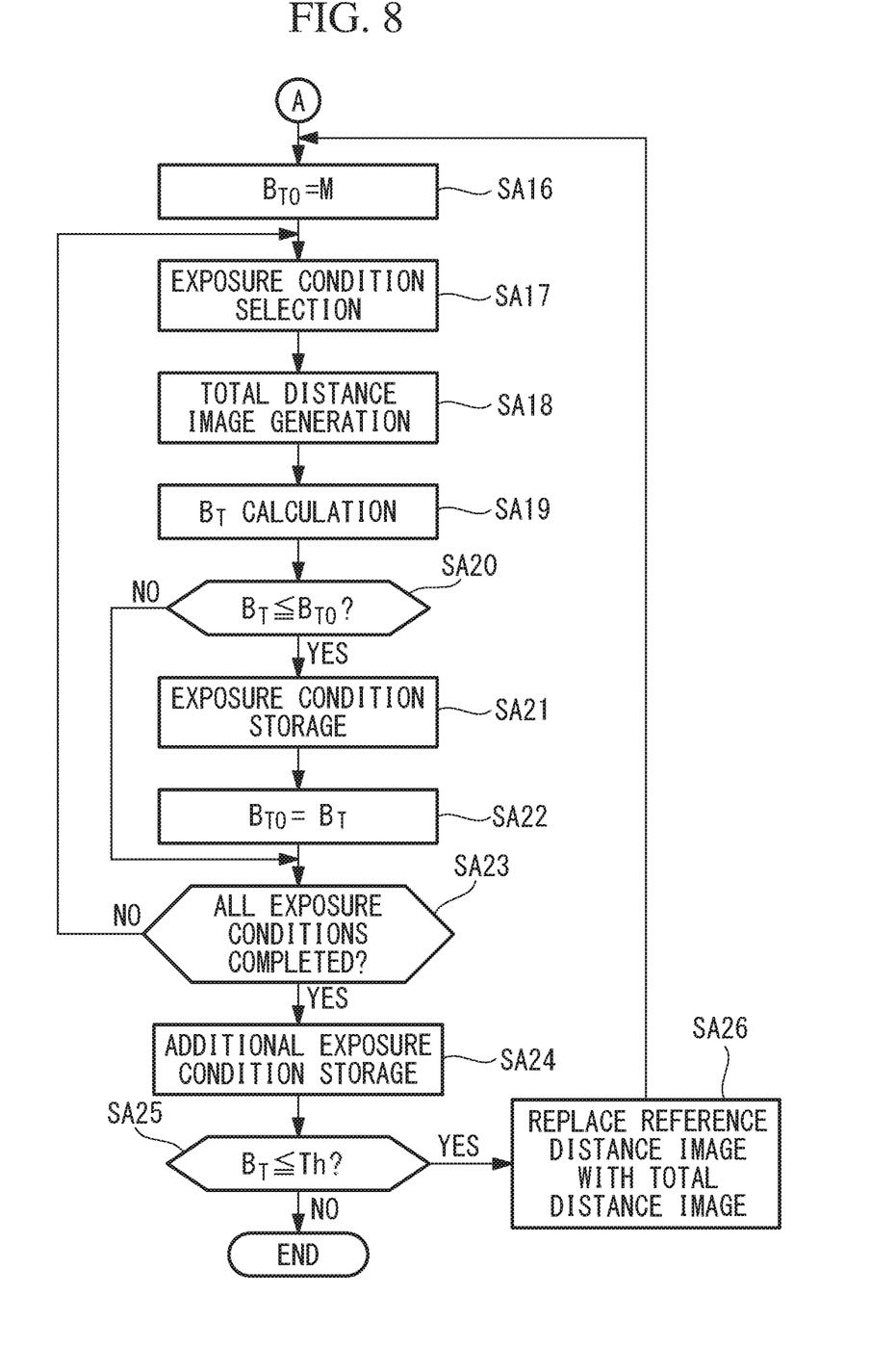
FIG. 8 is a flowchart following the flowchart of FIG. 7 for explaining the three-dimensional imaging condition adjusting method used by the three-dimensional imaging device in FIG. 6.

The exposure condition adjusting unit 12 receives a command for setting a new exposure condition from the outside, and thereby, in accordance with the exposure condition adjusting method illustrated in the flowcharts in FIGS. 7 and 8, sets the exposure condition used for acquisition of a distance image of the measurement object O.

First, a reference exposure condition, which is an exposure condition that is used as a reference, is set.

The setting of the reference exposure condition is performed by switching the exposure condition and acquiring a distance image by the three-dimensional sensor 5 under each exposure condition. As the exposure condition, the light intensity I of the illumination light from the projector 9 is switched among several levels, and the exposure time of the two-dimensional cameras 7 and 8 is switched among several levels, and a plurality of exposure conditions including all combinations of the light intensity of illumination light I and the exposure time E are realized.

Specifically, as illustrated in FIG. 7, the exposure condition adjusting unit 12 sets the light intensity I of the projector 9 of the three-dimensional sensor 5 to the minimum value $I_0$ (step SA1) and sets the exposure time E of the two-dimensional cameras 7 and 8 to the minimum value $E_0$ (step SA2). In addition, the imaging count N is initialized (step SA3).

A distance image is acquired by the distance image acquiring unit 2 under the set exposure condition (step SA4).

The acquired distance image is sent to and stored in the position accuracy calculation unit 23 (step SA5).

It is determined whether or not the imaging count N has reached a predetermined count Na (step SA6), and, in the case where the imaging count N has not reached the predetermined count Na (condition="NO"), the imaging count N is incremented once (step SA7), and the process from SA4 is repeated.

When the Na distance images obtained in a predetermined imaging count Na have been sent (condition="YES"), the position accuracy calculation unit 23 calculates a variation in the distance value based on these distance images (repeated recognition accuracy) (step SA8).

The variation in the distance value is, for example, calculated as follows.

For example, the shape of the measurement object O is registered in advance as a model, and pattern matching is performed on the distance image acquired by the distance image acquiring unit 2 to search for the same shape as the model. As a result of the search, the position of the recognized measurement object O on the image is temporarily stored. Imaging, searching, and storing of the position are repeated Na times. Then, the variation is calculated from the stored Na positions. Preferably, the standard deviation is calculated for each component of the position (X, Y) of the measurement object O, and the variation is evaluated.

The calculated variation in the distance is associated with the exposure condition and stored in the exposure condition adjusting unit 12 (step SA9). Then, the exposure condition adjusting unit 12 determines whether or not the exposure time E of the two-dimensional cameras 7 and 8 is the maximum value (step SA10), and when the exposure time E is not the maximum value (condition="NO"), the exposure time E is increased by one step (for example, $\Delta E=+1\%$)(step SA11), and the processes from step SA3 are repeated until the exposure time E reaches the maximum value (condition="YES").

In step SA10, in the case where the exposure time E has reached the maximum value (condition="YES"), it is determined whether or not the light intensity I of the projector 9 is the maximum value (step SA12), and in the case where the light intensity I is not the maximum value (condition="NO"), the light intensity I is increased by one step (for example, $\Delta I=+1\%$) (step SA13), and the processes from step SA2 are repeated until the light intensity I reaches the maximum value (condition="YES").

Thereby, the variations in the distance values of the distance images for a plurality of exposure conditions consisting of all combinations of the light intensity I of the illumination light and the exposure time E are calculated and stored in association with the exposure times E.

When distance images and variations in the distance values corresponding to all the exposure conditions have been acquired, the exposure condition adjusting unit 12 extracts the exposure condition with the smallest variation among the stored exposure conditions, and stores it in the exposure condition storage unit 13 as the reference exposure condition (step SA14). Thereby, the reference exposure condition is set.

Next, it is determined whether or not the reference variation Bs, which is a variation in the reference distance image that is the distance image acquired under the reference exposure condition, is equal to or smaller than a predetermined threshold value Th (Step SA15).

If the reference variation Bs is equal to or smaller than the threshold value Th in step SA12 (condition="YES"), the exposure condition adjusting process ends. In this case, the exposure condition used when acquiring the distance image of the measurement object O is the only reference exposure condition.

If the reference variation Bs is larger than the threshold value Th in step SA12 (condition="NO"), an additional exposure condition is set.

Specifically, as illustrated in FIG. 8, the setting of the additional exposure condition is performed by setting an initial value $B_{T0}$ of the variation to an arbitrary value (for example, a large range that cannot be within the range of variation) M (step SA16), and one of the exposure conditions different from the already set exposure condition is selected (step SA17). Then, the distance image acquired under the selected exposure condition and the reference distance image are combined to generate a combined distance image (step SA18). Thereafter, the generated combined distance image is input to the position accuracy calculation unit 23, and a combined variation $B_T$, which is a variation in the combined distance image, is calculated (step SA19).

It is determined whether or not the combined variation $B_T$ is equal to or less than the initial value $B_{T0}$ (step SA20), and, in the case where the combined variation $B_T$ is equal to or less than the initial value $B_{T0}$ (condition="YES"), the selected exposure condition is temporarily stored (step SA21), and the combined variation $B_T$ is replaced with a new initial value $B_{T0}$ (step SA22). Then, it is determined whether or not all the exposure conditions have been completed (step SA23), and if not, the processes from step SA17 are repeated.

In step SA20, when the combined variation $B_T$ is larger than the initial value $B_{T0}$, the processes from step SA23 are executed. If it is determined in step SA23 that all exposure conditions have been completed, the finally stored exposure condition is stored (additionally set) in the exposure condition storage unit 13 as an additional exposure condition (step SA24)).

Furthermore, it is determined whether or not the combined variation $B_T$ is equal to or smaller than the threshold value Th (step SA25), and, in the case where the combined variation $B_T$ is equal to or smaller than the threshold value Th, the combined distance image is replaced with a new reference distance image (step SA26), and the processes from step SA16 are repeated.

In step SA25, in the case where the combined variation $B_T$ is larger than the threshold value Th, the exposure condition adjusting process is completed, and two or more exposure conditions including the reference exposure condition stored in the exposure condition storage unit 13 are the exposure conditions used when acquiring the distance image of the measurement object O.

Also by using the three-dimensional imaging device 21 and the imaging condition adjusting method according to the present embodiment, before acquiring the distance image of the measurement object O, the exposure conditions to be used can be set, and the distance image of the subsequent measurement object O can be acquired in a short time. That is, there is an advantage that the time required for measurement can be greatly reduced compared with the conventional method in which distance images of the measurement object O are acquired while switching the exposure time E exhaustively.

In addition, since exposure conditions that enable the acquisition of distance images with small variations in the position of the measurement object O are selected, it is possible to obtain a distance image obtained by accurately measuring the distance of what is desired to be found, that is, the measurement object O.

Further, in the present embodiment, the exposure condition that minimizes the variation in the position of the measurement object O is selected as the reference exposure condition; however, the present invention is not limited to this. For example, while changing the exposure condition, any exposure condition whose variation is less than a predetermined threshold value may be set as the reference exposure condition. By appropriately setting the threshold value, it is possible to set the reference exposure condition in a short time without detecting variations for all the exposure conditions.

In addition, when the distance image is generated, the SAD value of each pixel may be stored for each pixel. In the case where effective pixels of the distance images to be combined overlap when generating the combined distance image in the distance image combining unit 4, the distance values having the smaller SAD value, that is, the distance values having the higher degree of matching may be adopted as the pixel values of the combined distance image. Thereby, a combined distance image having more reliable distance values can be acquired.

The invention claimed is:
1. An imaging device, comprising:
a distance image acquiring unit; and
an image condition adjusting unit connected to the distance image acquiring unit;
wherein the distance image acquiring unit comprises an image processing unit connected to a three dimensional sensor,
wherein the three-dimensional sensor acquires a first image of a measurement object and a second image of the measurement object,
wherein the first image differs from the second image by a parallax,
wherein the image processing unit comprises a first processor and a first memory,
wherein the image processing unit generates a plurality of distance images by calculating a distance value for each pixel in each first image and in each second image using the parallax,
wherein the image condition adjusting unit comprises a second processor and a second memory,
wherein the image condition adjusting unit is adapted to adjust an exposure condition and a light intensity,
wherein the exposure condition comprises at least an exposure time,
wherein the light intensity comprises at least an intensity of light projected onto the measurement object,
wherein the image condition adjusting unit comprises at least an exposure condition adjusting unit and an effective pixel count calculation unit,
wherein the exposure condition adjusting unit, executed on the second processor, initially adjusts the exposure condition to a minimum exposure value and the light intensity to a minimum intensity value, thereby permitting the image processing unit to generate an initial distance image,
wherein the effective pixel count calculation unit, executed on the second processor, calculates an effective pixel count for each of the plurality of distance images,
wherein the effective pixel count comprises a number representing those pixels having a non-zero distance value,
wherein the effective pixel count calculation unit calculates an initial effective pixel count for the initial distance image,
wherein, after calculating the initial effective pixel count, the exposure condition adjusting unit incrementally increases the exposure condition to a plurality of adjusted exposure values, greater than the minimum exposure value, and also incrementally increases the light intensity to a plurality of adjusted intensity values, greater than the minimum intensity value, thereby permitting the image processing unit to generate a plurality of adjusted distance images,
wherein the effective pixel count calculation unit calculates a plurality of adjusted effective pixel counts for each of the adjusted distance images,
wherein the exposure condition adjusting unit stops increasing the exposure condition after reaching a maximum exposure value and also stops increasing the light intensity after reaching a maximum intensity value, thereby permitting the image processing unit to generate a final distance image,
wherein the effective pixel count calculation unit calculates a final effective pixel count for the final distance image,
wherein the exposure condition adjusting unit stores, as a reference exposure condition for a reference distance image, the exposure condition having the largest corresponding effective pixel count from one of the initial distance image, the adjusted distance images, and the final distance image,
wherein the largest corresponding effective pixel count is stored as a reference effective pixel count,
wherein the exposure condition adjusting unit compares the reference effective pixel count to a first threshold value,
wherein, if the reference effective pixel count is less than or equal to the first threshold value, the exposure condition adjusting unit sets an additional exposure condition that is different from the reference exposure condition,
wherein, after the exposure condition adjusting unit sets the additional exposure condition, the image processing unit generates an additional distance image,
wherein the image condition adjusting unit generates a total distance image, the total distance image being a sum of the additional distance image and the reference distance image, and
wherein the image condition adjusting unit repeats setting of the additional exposure condition, using the total distance image as a new reference distance image, until a total effective pixel count is larger than the first threshold value, thereby maximizing a total effective pixel count.
2. The imaging device according to claim 1, wherein the exposure condition adjusting unit also sets a second exposure condition with a second effective pixel count larger than a second threshold value.

3. The imaging device according to claim 1, wherein the distant image acquiring unit generates the plurality of distance images by evaluating, for each pixel in each first image and in each second image, a degree of matching therebetween, and, by assigning a distance value to a pixel when the degree of matching is greater than a predetermined threshold value.

4. The imaging device according to claim 3, further comprising a distance image combining unit connected to the image condition adjusting unit, wherein the distance image combining unit generates combined distance images based on the distance images acquired individually for all of the exposure conditions where the reference effective pixel count or the total effective pixel count is larger than the first threshold value.

5. The imaging device according to claim 3, wherein, in each of the plurality of distance images, the degree of matching is stored for each pixel that is found to be an effective pixel, and where the effective pixels for the combined distance image overlap, the distance image combining unit adopts, as a pixel value of the combined distance image, the distance value having the greater degree of matching between two effective pixels that are compared.

6. An imaging method, comprising:

acquiring a first image of a measurement object and a second image of the measurement object, wherein the first image differs from the second image by a parallax;

generating a plurality of distance images by calculating a distance value for each pixel in each first image and in each second image using the parallax;

initially adjusting an exposure condition to a minimum exposure value and a light intensity to a minimum intensity value, to generate an initial distance image, wherein the exposure condition comprises at least an exposure time and wherein the light intensity comprises at least an intensity of light projected onto the measurement object;

calculating an initial effective pixel count of the initial distance image, wherein an effective pixel count comprises a number representing those pixels having a non-zero distance value;

after calculating the initial effective pixel count, incrementally increasing the exposure condition to a plurality of adjusted exposure values, greater than the minimum exposure value, and incrementally increasing the light intensity to a plurality of adjusted intensity values greater than the minimum intensity value, to generate a plurality of adjusted distance images;

calculating a plurality of adjusted effective pixel counts for each of the adjusted distance images;

stopping increasing the exposure condition after reaching a maximum exposure value and stopping increasing the light intensity after reaching a maximum intensity value, to generate a final distance image;

calculating a final effective pixel count of the final distance image;

storing, as a reference exposure condition for a reference distance image, the exposure condition having the largest corresponding effective pixel count from one of the initial distance image, the adjusted distance images, and the final distance image, wherein the largest corresponding effective pixel count is stored as a reference effective pixel count;

determining whether the reference effective pixel count is equal to or less than a threshold value;

if the reference effective pixel count is equal to or less than the threshold value, setting an additional exposure condition that differs from the reference exposure condition;

generating an additional distance image at the additional exposure condition;

generating a total effective pixel count of a total distance image, which is a sum of the additional distance image and the reference distance image, and repeatedly setting the additional exposure condition, using the total distance image as a new reference distance image, until the total effective pixel count is larger than the threshold value.

* * * * *